United States Patent
Soroushi et al.

(10) Patent No.: US 7,191,352 B2
(45) Date of Patent: Mar. 13, 2007

(54) CIRCUIT AND METHOD FOR CONTROLLING A POWER CUT-OFF PROTECTION CIRCUIT

(75) Inventors: Atousa Soroushi, North Vancouver (CA); Patrick Wai-Tong Leung, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/902,542

(22) Filed: Jul. 29, 2004

(65) Prior Publication Data

US 2006/0022988 A1 Feb. 2, 2006

(51) Int. Cl.
G06F 1/00 (2006.01)
G06F 9/00 (2006.01)
G06F 11/00 (2006.01)

(52) U.S. Cl. .............................. 713/340; 713/1; 714/22
(58) Field of Classification Search ................ 345/501, 345/530, 536, 204, 208, 210–212, 214; 713/1, 713/340; 326/62, 80–83; 714/22, 24, 14; 361/1
See application file for complete search history.

(56) References Cited

U.S. PATENT DOCUMENTS

| | | | | |
|---|---|---|---|---|
| 4,454,575 A | * | 6/1984 | Bushaw et al. | 345/504 |
| 5,465,360 A | * | 11/1995 | Miller et al. | 713/1 |
| 6,101,600 A | * | 8/2000 | Arnold et al. | 713/1 |
| 6,523,125 B1 | | 2/2003 | Kohno et al. | |
| 6,526,514 B1 | | 2/2003 | Nguyen et al. | |
| 6,608,476 B1 | * | 8/2003 | Mirov et al. | 324/103 R |
| 6,654,896 B1 | | 11/2003 | Saunders et al. | |
| 6,700,407 B1 | * | 3/2004 | Wert | 326/81 |
| 6,768,368 B2 | * | 7/2004 | Kaneko et al. | 327/333 |
| 6,894,537 B1 | * | 5/2005 | Wert | 326/63 |
| 6,909,417 B2 | * | 6/2005 | Washio et al. | 345/98 |
| 7,017,056 B1 | * | 3/2006 | Lettang et al. | 713/310 |
| 2002/0041266 A1 | * | 4/2002 | Koyama et al. | 345/87 |
| 2003/0120973 A1 | | 6/2003 | Hatakeyama | |
| 2003/0214506 A1 | * | 11/2003 | Koselj et al. | 345/519 |

OTHER PUBLICATIONS

"Clock gating." http://www.webopedia.com/TERM/C/clock_gating.html.*
"SR Flip Flop," http://isweb.redwoods.cc.ca.us/INSTRUCT/CalderwoodD/diglogic/srflip.htm.*

* cited by examiner

Primary Examiner—Ulka Chauhan
Assistant Examiner—Joni Hsu
(74) Attorney, Agent, or Firm—Mark P. Watson

(57) ABSTRACT

A power cut-off protection control circuit and method. A memory pair and a selecting circuit are provided. The memory pair stores data made available at respective storage inputs of first and second storage elements of the pair and provides the stored data at respective storage outputs thereof. The memory pair has a polarity selecting input through which the output of one of the first and second storage elements is caused to correspond to a first control state of the switch and the output of the other of the first and second storage elements is caused to correspond to a second control state of the switch. The selecting circuit has inputs coupled to the respective storage outputs of the memory pair and an output coupled to a control line of the switch for controlling the switch. A selecting line of the selecting circuit selects between the inputs, for selecting one or the other of the storage outputs of the first and second storage elements.

30 Claims, 3 Drawing Sheets

FIG. _1
(PRIOR ART)

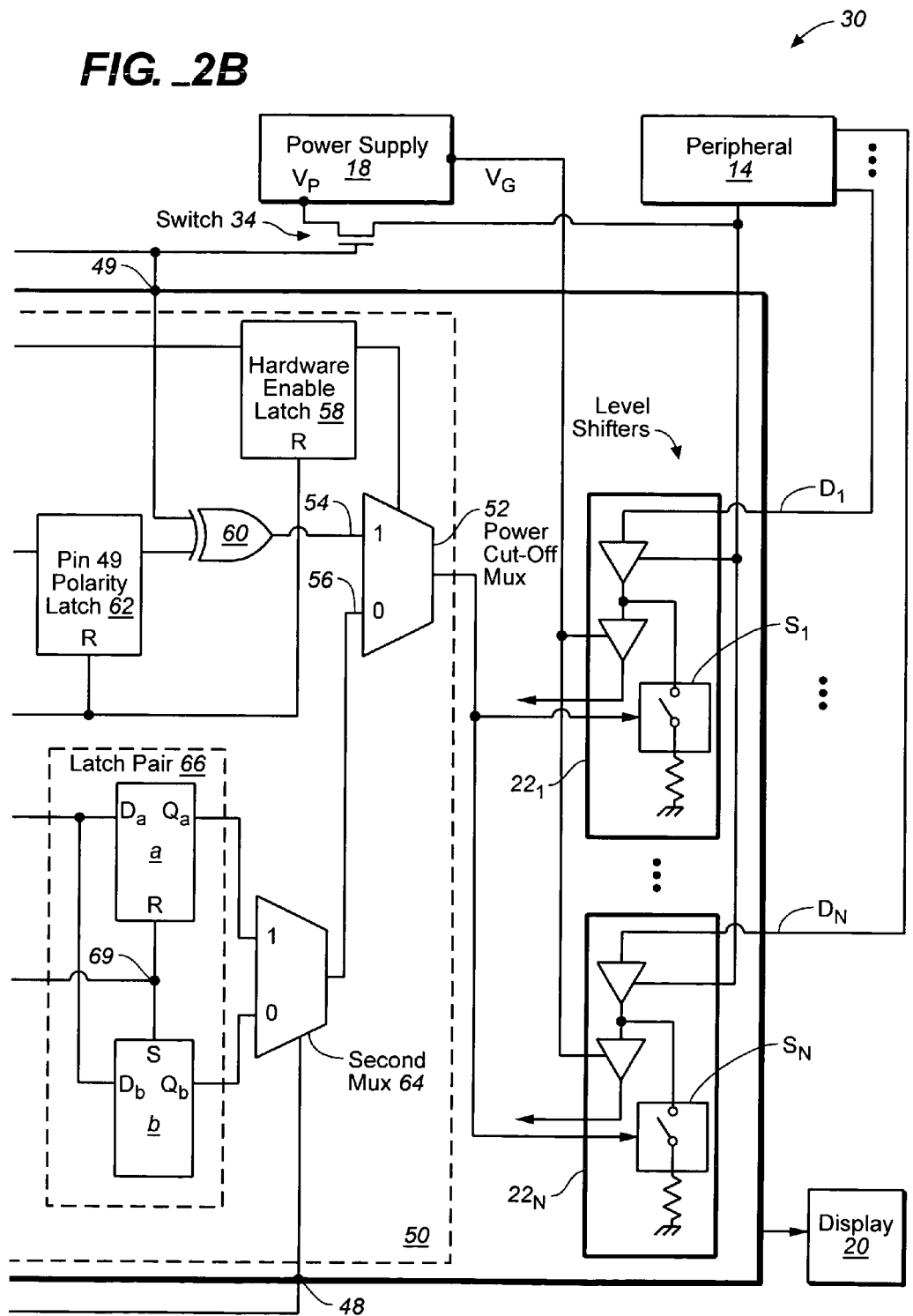
FIG. _2B

CIRCUIT AND METHOD FOR CONTROLLING A POWER CUT-OFF PROTECTION CIRCUIT

This invention relates to a circuit and method for controlling a power cut-off protection circuit, particularly for use in a system including a graphics controller and a peripheral. More particularly, the invention relates to such a circuit and method for protecting the graphics controller from damage due to a loss of the power commonly supplied to the peripheral and the graphics controller.

BACKGROUND

Graphics display systems typically employ a graphics controller chip between a host CPU and a graphics display device, such as an LCD panel. Generally, such systems also include one or more peripheral devices. For example, in cellular telephones it is becoming increasingly common to couple a camera peripheral to the graphics controller. Both the camera and the host CPU are capable of providing corresponding sets of image data. The graphics controller can select between the sets of data for provision to the display device, or the graphics controller can overlay one set of data on the other set of data for provision to the display device.

Where the peripheral is a camera, the graphics controller receives image data from the peripheral. Alternatively, the graphics controller could provide data to the peripheral. In either case, data exchanged between the graphics controller and the peripheral must typically be level shifted because the graphics controller and the peripheral are typically powered at different voltage levels. Accordingly, the graphics controller includes a level shifter for, e.g., each bit of a parallel data bus. The level shifters are typically formed of CMOS technology.

The graphics controller includes a pin for receiving power from the peripheral to provide to one side of each level shifter with power while, internally, power used by the graphics controller is provided to the other side of the level shifters. So long as the power from the peripheral is "on," the level shifters function normally.

On the other hand, damage to the level shifters can result from CMOS latch-up if the peripheral is powered down while the graphics controller remains powered up. Yet it is often desired to power down the peripheral while the graphics controller remains powered up, for example, to reduce power consumption when processing an image received from the peripheral.

This problem has been solved by providing a power cut-off protection circuit in the graphics controller. The power cut-off protection circuit is controlled by another circuit that includes a register to which the host CPU writes at substantially the same time that the host CPU powers down the peripheral. The contents of the register are used to turn on respective MOSFETs connecting the level shifters to ground. This prevents CMOS latch-up in the level shifters when the power from the peripheral is cut-off.

This solution to the problem is not complete. If the graphics controller is reset any time that the peripheral power is off, the contents of the register are lost with the consequence that the MOSFET is turned back off, thus exposing the level shifters to the problem which the cut-off circuit was intended to solve.

Accordingly, there is a need for a circuit and method for controlling a power cut-off protection circuit that provides for more robust protection than has been provided in the prior art.

SUMMARY

A preferred power cut-off protection control circuit and method according to the present invention is disclosed for use in a graphics controller. The graphics controller is controlled by a host and connected to a peripheral. The graphics controller includes a level shifter for shifting the voltage level of a signal received from the peripheral to a different voltage level suitable for processing the signal in the graphics controller. A switch is provided in a current path between the level shifter and ground. The switch is on or off in respective first and second control states of the switch.

Preferred power cut-off control circuits include a memory pair and a selecting circuit. The memory pair stores data made available at respective storage inputs of first and second storage elements of the pair and provides the stored data at respective storage outputs thereof. The memory pair has a polarity selecting input through which the storage data output of one of the first and second storage elements is caused to correspond to the first control state of the switch and the storage data output of the other of the first and second storage elements is caused to correspond to the second control state of the switch. The selecting circuit has inputs coupled to the respective storage outputs of the memory pair and an output coupled to a control line of the switch for controlling the switch. A selecting line of the selecting circuit selects between the inputs, for selecting one or the other of the storage outputs of the first and second storage elements.

Corresponding methods and media are also disclosed.

It is to be understood that this summary is provided as a means of generally determining what follows in the drawings and detailed description and is not intended to limit the scope of the invention. Objects, features and advantages of the invention will be more readily understood upon consideration of the following detailed description taken in conjunction with the accompanying drawings.

DETAILED DESCRIPTION OF PREFERRED EMBODIMENTS

Figure 1:
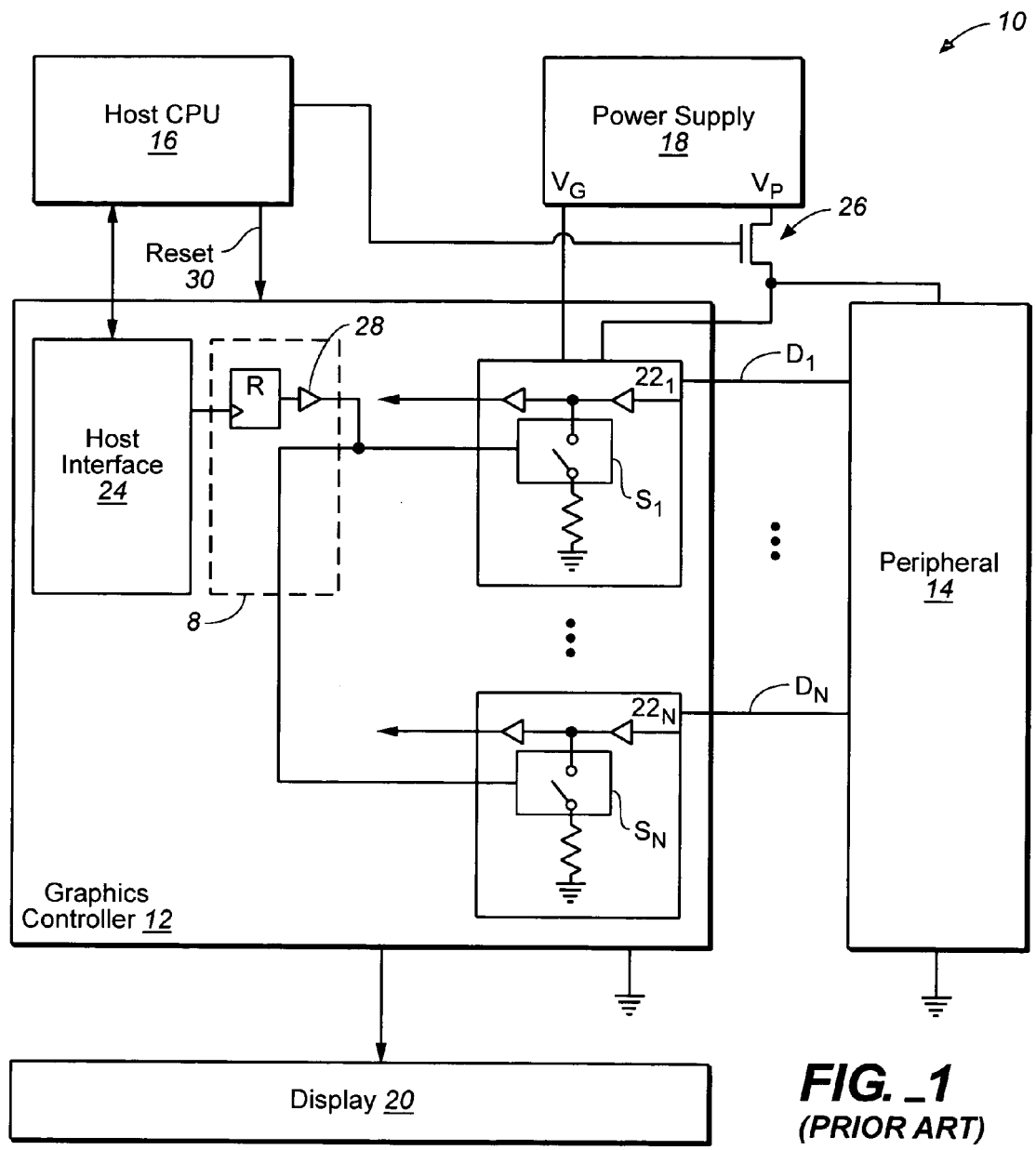
FIG. 1 is schematic diagram of a prior art circuit for controlling a power cut-off protection circuit for a system including a graphics controller and a peripheral.

FIG. 1 shows a prior art circuit for controlling a power cut-off protection circuit 8 for a typical electronic computing and display system 10 having a graphics controller 12, a peripheral 14 such as a camera, a host CPU 16, a regulated power supply 18, and a graphics display device 20 such as an LCD panel. The graphics controller typically manages image data streaming from the camera and the CPU so as to combine the image data into a composite, and provides the composite data to the display device. The host CPU 16 communicates with the graphics controller 12 through a host interface 24 in the graphics controller.

The components, 8 and 12 to 20, form a system 10 that is a preferred context for the present invention, but the manner of operation of the system and its particular form can vary greatly. For example, the host may be something other than a computer or CPU, and power cut-off control circuits and methods according to the invention may be practiced in chips or devices other than graphics controllers, so that no graphics display device is required, and the peripheral may be something other than a camera.

The peripheral 14 typically provides a number of data lines $D_1$–$D_N$ where N is typically 8. The power supply provides two voltage outputs $V_G$ and $V_P$ for powering the graphics controller 12 and the peripheral 14, respectively. The two voltages are each provided to respective sides of level shifters $22_1$ and $22_N$, where it is understood that there is a level shifter for each data line D. The level shifters provide level shifted data to the graphics controller for internal processing. However, the level shifters may be used to shift control signals or other signals as well.

A register "R" is provided in the graphics controller for controlling switches $S_1$–$S_N$, which connect the respective level shifters 22 to ground when closed. The switches S function as power cut-off protection circuits. The switches are typically MOSFETS but may be of any desired technology.

The host CPU 16 controls the power $V_P$ provided to the peripheral 14 as well as the graphics controller 12 by use of a switch 26, typically a MOSFET. The CPU turns off the switch 26 and then issues a command to the host interface 24 to write "a" the register "R." The output of the register "R" is coupled to a buffer 28. The buffer 28 drives a signal for controlling the switches S. In response to the "1" stored in the register "R," the buffer 28 drives a signal that turns the switches S on.

The CPU 16 may instruct the graphics controller 12 to reset at any time by activating a reset line 30. If the graphics controller is reset, however, the content of the register "R" is lost, i.e., the "1" is replaced by a "0." This turns the switches S off, resulting in large currents in the level shifters 22. This consumes power and can lead to CMOS latch-up.

It may first be thought that this problem can be avoided by modifying the graphics controller so that storing a "0" in the register "R" (instead of a "1") turns on the switches "S." In this scenario, the CPU turns off the switch 26 and issues a command to the host interface 24 to write a "0" to the register "R," turning on the switches "S." Then, if the graphics controller is reset while the power to the peripheral is off, the content of register "R" remains "0" and the switches S remain on.

But this "solution" creates a problem. Continuing the scenario, the CPU turns on the switch 26 and issues a command to the host interface 24 to write a "1" to the register "R," turning off the switches "S." It is desirable for the switches "S" to be off when the peripheral is on. If the graphics controller is reset while the power to the peripheral is on, however, the content of the register R becomes "0," turning on the switches "S." Having the switches "S" on when the peripheral is also on can cause large currents in the level shifters, consuming power and potentially leading to CMOS latch-up.

Figures 2, 2A:
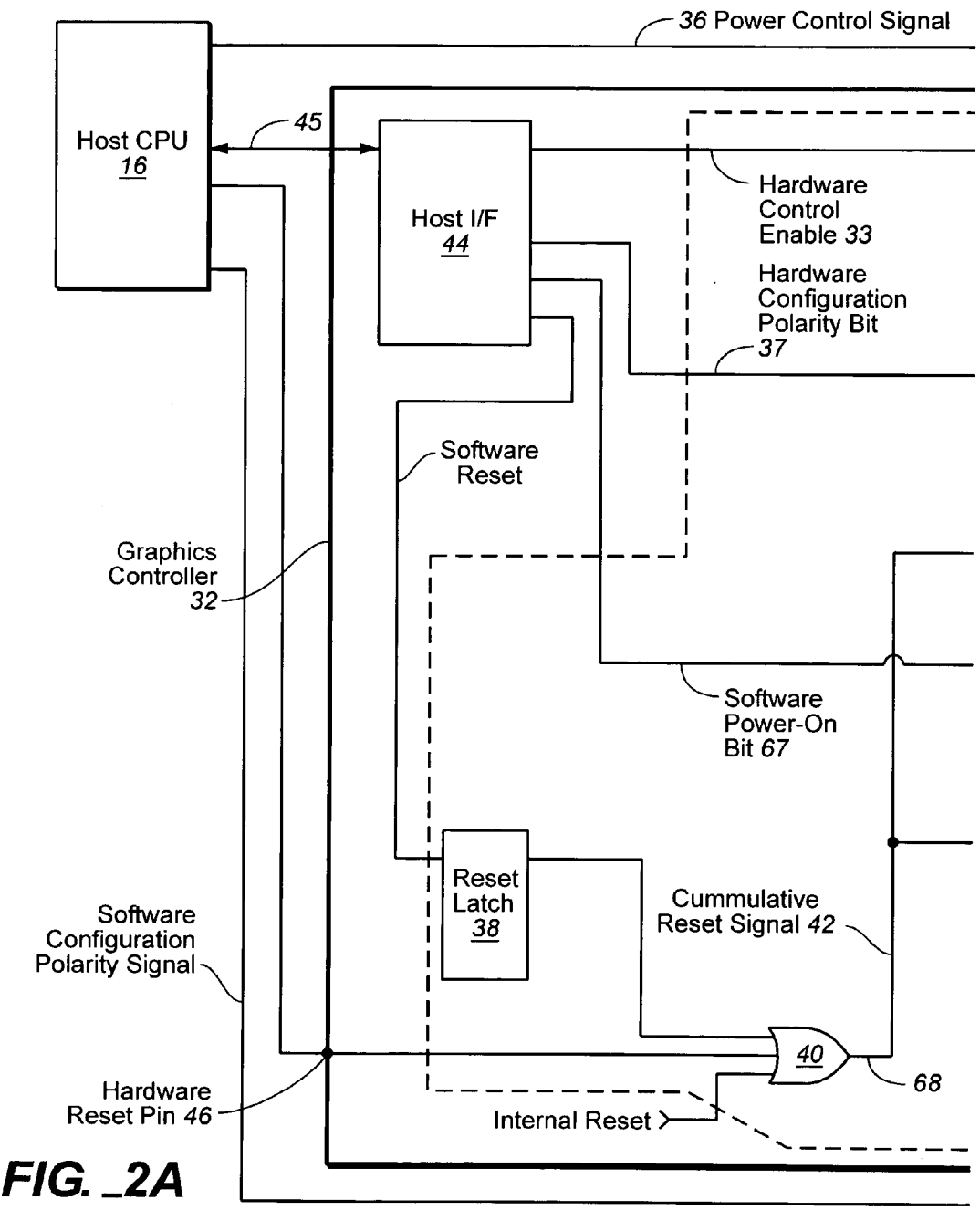
FIG. 2 is a schematic diagram of a preferred circuit for controlling a power cut-off protection circuit for a system including a graphics controller and peripheral according to the present invention.

FIG. 2 shows a preferred power cut-off protection control circuit 50 for an electronic computing and display system 30 according to the present invention. The system 30 includes a graphics controller 32. The system 30 also includes a peripheral 14, CPU 16, power supply 18, and graphics display device 20, and these components may be the same as those described above. In addition, the graphics controller 32 includes level shifters $22_1$ and $22_N$, each shifter having a switch "S", which functions as a power cut-off protection circuit. The preferred circuit 50 provides for either hardware or software control of cut-off protection circuits $S_1$ to $S_N$.

The peripheral 14 typically provides a number of data lines $D_1$–$D_N$ for sending bits of data to the graphics controller in parallel. However, only one data line may be used for serial transmission of the data. Moreover, in an alternative embodiment, the peripheral 14 may receive bits of data on the data lines $D_1$–$D_N$.

The power supply provides two voltage outputs $V_G$ and $V_p$ for powering the graphics controller 32 and the peripheral 14, respectively. The two voltages are each provided to respective sides of level shifters $22_1$ and $22_N$. The graphics controller includes a level shifter for each data line D. The level shifters provide level shifted data to the graphics controller for internal processing. In an alternative embodiment, the level shifters provide level shifted data to the peripheral. The switches $S_1$–$S_N$ connect the respective level shifters 22 to ground, providing power cut-off protection. The switches are typically MOSFETS (NMOS or PMOS) but may be of any desired technology.

The voltage output $V_P$ of the power supply 18 is connected or disconnected from the peripheral 14 and the level shifters 22 by control of a switch 34. A power control signal 36 is issued by the host 16 to turn the switch 34 on or off, thereby connecting or disconnecting the power $V_P$ to the peripheral 14 and the level shifters 22.

The host CPU 16 communicates with the graphics controller 32 through a bus 45 connected to a host interface 44 in the graphics controller. The host interface 44 issues output bits as described below in response to instructions from the host.

A preferred embodiment 50 of a circuit for controlling a power cut-off protection circuit according to the present invention is shown in FIG. 2. The circuit 50 is provided on-board the graphics controller 32. Persons of ordinary skill will readily appreciate that the circuit 50 and variations of it may be implemented in hardware, firmware, software, or in any combination of these types of components, using any technology, in alternative embodiments as desired.

A power cut-off multiplexer 52 directly drives the switches S of the power cut-off protection circuits. Each switch S has two control states. In the first control state, the switch S is on or closed. In the second control state, the switch S is off or open. Each switch S makes a current path between the respective level shifter and ground in the first control state, and breaks the path in the second control state. The switches are shown as being generic. Either a high or low signal from the multiplexer 52 may be employed to cause the switches S to enter a particular control state. The switches S are preferably MOSFETS, but may be a switch of any desired technology.

The power cut-off multiplexer 52 has two inputs: input 54 for hardware control and input 56 for software control. The inputs of the multiplexer 52 are selected by the output of a hardware enable latch 58, which is set by a hardware control enable bit output on line 33 of the host interface 44.

Hardware Control

The hardware control enable bit selects between hardware control and software control of the power cut-off protection circuit. In the shown embodiment, setting the hardware control enable bit to "1" selects hardware control. In hardware control mode, the host CPU controls the power cut-off protection circuit via a pin 49 on the graphics controller 32.

Hardware control is preferably implemented in the circuit 50 with a logic circuit that includes an exclusive OR gate 60 and a pin 49 polarity latch 62. This logic circuit uses the power control signal 36, which it obtains on a pin 49 of the graphics controller. As mentioned above, the host uses the power control signal 36 to connect and disconnect the power $V_P$ to the peripheral 14. While the use of the one signal 36 to control both $V_P$ and the switches S is advantageous, it is not necessary for this logic circuit to use the power control signal 36. In an alternative embodiment, this circuit uses a signal on pin 49 that is dedicated for hardware control of the switches S.

The pin 49 polarity latch 62 is set by a hardware configuration polarity bit which is provided on a line 37 of the host interface 44. The hardware polarity bit is configured by the host to assume the value ("1" or "0"), as required to ensure that the switches S are in the first control state (on or closed) when the output $V_P$ is disconnected. The power control signal 36 and the output of a latch 62 are input to the exclusive OR gate 60. The output 54 of the exclusive OR gate 60 is coupled to a first input of the power cut-off multiplexer 52.

An example illustrates the hardware control mode. Assume that the peripheral power output $V_P$ is disconnected when the power control signal 36 is low. Also assume that the switches S are placed in their first control state (turned on) when an input 54 to the power cut-off multiplexer 52 is high. Setting the hardware polarity bit high (stored in the pin 49 polarity latch 62) causes the exclusive OR gate 60, when the power control signal 36 is low, to provide an output that is high. This high signal is passed through the multiplexer 52 to turn on the switches S when the peripheral power VP is disconnected.

The host 16 turns the peripheral 14 back on by providing it with power $V_P$. The host 16 provides power $V_P$ by turning the switch 34 back on. The host does this by causing the power control signal 36 to transition high. The causes the output 54 of the exclusive OR gate 60 to toggle. Continuing the example, when the host causes the power control signal 36 to transition high, the output of the exclusive OR 60 will go low, turning the switches S off. Thus, when the peripheral power $V_P$ is connected, the switches S are off.

This example is summarized in the following table.

| Power Control Signal | Peripheral Voltage $V_P$ | Register 62 | Input 54 | Switch S |
|---|---|---|---|---|
| 0 | Off | 1 | 1 | On |
| 1 | On | 1 | 0 | Off |

The hardware polarity bit held in the pin 49 polarity latch 62 will be reset if the graphics controller 32 is reset.

A reset of the graphics controller is indicated by a reset signal provided on a line 42. The reset signal can be asserted as a result of a number of different influences and is referred to as a "cumulative" reset signal. For example, the cumulative reset signal may result from instruction of the host 16, either through a hardware signal, bit or code provided at hardware reset pin 46 of the graphics controller 32, or as a software instruction issued through the host interface 44 to a reset latch 38. Alternatively, the graphics controller itself may generate an internal reset signal, bit or code. It should be understood that, in general, signals, bits, codes (e.g., bytes) or the like function similarly and may be used interchangeably with appropriate modification as will be immediately appreciated by persons of ordinary skill. These are generically referred to herein as "indications."

Another logic circuit selects any of the aforementioned routes for resetting the graphics controller. Particularly, in the preferred circuit 50 a three-input OR gate 40 generates the cumulative reset signal on line 42. A first input to OR gate 40 is coupled to reset latch 38. A second input is coupled to the hardware reset pin 46. And a third input is coupled to an internal reset signal. The output of the OR gate 40 is coupled to line 42. Line 42 is coupled to the latches 58, 62, and to latch pair a and b.

The content stored in the pin 49 polarity latch 62 is reset to "0" when the cumulative reset signal is asserted on line 42. Therefore, if the hardware polarity bit stored in latch 62 was a "1" to place the switches S in a first control state (on), then the switches S will turn off as the result of a cumulative reset signal being asserted on line 42 during a time when the power $V_P$ is disconnected from the peripheral. This result is undesirable.

To prevent this undesirable result, hardware control may be provided that does not depend on the use of a graphics controller register that is susceptible upon reset to memory loss. For example, the pin 49 of the graphics controller could be coupled directly to the switches S. However, this approach requires that the polarity of the power control signal 36 supplied by the host match the requirements of the switches S. Requiring a predefined polarity for the power control signal 36 is a disadvantage as a graphics controller having the ability to use whatever polarity of signal may be available in a particular system is more flexible and desirable. It is an outstanding advantage of the present invention that the necessary polarity can be configured with software via the pin 49 polarity latch 62, so that any host 16 may operate a graphics controller chip 32 requiring either of two states for operating the switches "S."

When the power $V_P$ is disconnected from the peripheral, the contents stored in the pin 49 polarity latch 62 is set to "1", turning on the switches "S." The content of the latch 62 is reset to "0", however, when the cumulative reset signal is asserted on line 42. As a result, when operating in hardware control mode and when the power $V_P$ is disconnected from the peripheral, the state of the switches S changes upon reset of the graphics controller. To avoid this undesirable state change, the circuit 50 connects the cumulative reset signal on line 42 to the hardware enable latch 58. Reselling the latch 58 controls the power cut-off multiplexer 52 to select software control. As described below, when operating under hardware control with $V_P$ off, this selection of software control prevents the undesirable change in state of the switches S. After a reset, the host may, at any time, re-select hardware control by writing a "1" to the hardware enable latch 58.

Software Control

Software control is implemented in the preferred embodiment 50 by writing a "0" to the hardware enable latch 58. This zero may be written either, in the "normal" case, through the software interface, or by resetting the graphics controller 32. The output of the latch 58 selects the output 56 of a second multiplexer 64 as an input 56 to the power cut-off multiplexer 52 for driving the switches S.

In the normal case, software control is adapted to change the state of the switches S as required when the power $V_P$ to the peripheral is either connected or disconnected.

The second multiplexer 64 selects between a pair 66 of memory storage elements, particularly R-S latches "a" and "b" ("latch pair"), under control of a software configuration polarity signal that is made available at a pin 48 of the graphics controller 32. Each latch has a data storage input "D" ($D_a$, $D_b$) and a corresponding data storage output "Q"

($Q_a$, $Q_b$) for outputting latched data from the data storage input. One of the latches "a" has a reset input "R" and the other latch "b" has a set input "S." The inputs R and S are tied together and form, in a preferred embodiment, a polarity selecting input 69 that is coupled to the reset and set inputs of the latches "a" and "b."

A software power-on bit is provided on a line 67 of the host interface 44 to both data storage inputs D of the latches "a" and "b." The latches "a" and "b" therefore produce the same data storage outputs Q under normal operation. Where both latches of the latch pair produce the same data storage output, the software configuration polarity signal on pin 48 does not affect the output 56 of the second multiplexer 64.

Like the hardware polarity bit provided on line 37, the software polarity bit provided on line 67 is set by the host as is appropriate for controlling the switches S as desired and provides the flexibility of interfacing to switches S that are placed in the first control state by either a high or low signal.

If the graphics controller is reset, however, a cumulative reset signal will be provided on line 42. This will cause one of the latches "a" of the latch pair 66 to be reset to "0" and the other of the latches "b" of the latch pair to be set to "1." The host 16 asserts the desired software configuration polarity signal on pin 48 to select either latch "a" or "b," whichever is appropriate for the desired condition of the switches S.

Consider examples of normal and reset operations when operating under software control. If power $V_P$ to the peripheral is on, the switches S should be in the second control state (off or open); if power to the peripheral is off, the switches S should be in the first control state (on or closed). Assume that the switches S are in the first control state when the signal output from the power cut-off multiplexer 52 is high, and assume that the switches S are in the second control state when the output of multiplexer 52 is low.

As an example of normal operation, if power $V_P$ to the peripheral is on, the software power-on bit on line 67 should be low to maintain the switches off. When power $V_P$ is to be turned off, the host toggles the software power-on bit on line 67 from low to high turning the switches S on.

As an example of a reset operation, assume that the software power-on bit on line 67 is high, with a corresponding high on the output of the second multiplexer 64. When the graphics controller is reset, the contents stored in the latch pair 69 are lost as a result of the reset. The reset signal on line 42 resets latch "a" to "0" and sets latch "b" to "1". To maintain the high on the output of the multiplexer 64, the host sets the software configuration polarity bit on pin 48 low (in this example) thereby selecting the data storage output of latch "b." By selecting latch "b", the high on the output of the multiplexer 64 is maintained.

When power to the peripheral is restored, the host can regain control of the switches "S" by manipulating the software power-on bit on line 67. It should be readily apparent that the same degree of control can be provided under software control for any variation of the circuit shown in FIG. 2, through use of the software power-on bit and the software configuration polarity signal, so long as the host 16 is made aware of the circuit requirements. As mentioned previously, the host may also re-select hardware control through use of the hardware enable latch 58.

Having explained software control, the manner in which, when operating in hardware control mode and a reset occurs, a change in state of the switches "S" is prevented by the selection of software control is now described by way of an example. Assume that the peripheral power output $V_P$ is disconnected when the power control signal 36 is low. Also assume that the switches "S" are turned on when an input 54 to the multiplexer 52 is high. If the hosts stores a "1" in the pin 49 polarity latch 62 and turns off power to the peripheral by asserting the power control signal 36 low, the result is XOR gate 60 produces an output that is high, which turns on the switches "S" as desired. Assertion of a reset signal on line 42 resets the pin 49 polarity latch 62 to 0. But the power control signal 36 is still low. As a result, the XOR gate 60 produces an output that is high, turning the switches S off. As mentioned, this result in undesirable.

Assertion of a reset signal on line 42, however, also resets the hardware enable latch 58 to 0, placing the graphics controller in software mode, making the output of the XOR gate 60 temporarily not relevant. In addition, assertion of the reset signal resets latch "a" to 0, and sets latch "b" to 1. The host asserts a software configuration polarity signal on pin 48 that is low, selecting latch "b." The 1 stored in latch "b" restores the switches S to the on state, as desired.

Power cut-off circuits and methods according to the present invention may be implemented in hardware or software, or both, and may employ machine readable media embodying one or more programs of instruction executed by the machine as will be readily apparent to persons of ordinary skill in the art.

It should be recognized that, while a specific power cut-off circuit and method has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims that follow.

The invention claimed is:

1. A control circuit for enabling a host to control a power cut-off protection circuit, the protection circuit being adapted for preventing damage to a level-shifter when power to a peripheral is cut-off, the level-shifter for providing level-shifted signals and for coupling with the peripheral, the control circuit being suitable for use in a graphics controller that includes the level-shifter and the power cut-off protection circuit, the power cut-off protection circuit being coupled with the level-shifter and having a protection-circuit-control input for selecting one of first and second control states, the control circuit comprising:
    a memory pair including:
    a polarity-selecting input,
    a first storage element having an input, a first storage output, an initial-state input coupled with the polarity-selecting input, and being adapted to respond to a particular indication on the initial-state input by outputting a first predetermined indication,
    a second storage element having an input, a second storage output, an initial-state input coupled with the polarity-selecting input, and being adapted to respond to the particular indication on the initial-state input by outputting a second predetermined indication; and
    a first selecting circuit having first and second selecting-circuit inputs coupled respectively with the first and second storage outputs, an output coupled with the protection-circuit-control input, and a selecting input coupled with the host for selecting one of the first and second selecting-circuit inputs, wherein the control circuit thereby enables the host to control the power cut-off protection circuit following an assertion of the particular indication; and wherein the particular indication is a reset indication, the control circuit further comprises a reset-generating apparatus for generating the reset indication, and wherein the reset-generating apparatus is further adapted to generate the reset indication in response to a reset indication internally generated by the graphics controller.

2. The control circuit of claim 1, wherein the first predetermined indication is a binary number and the second predetermined indication is the binary complement of the first predetermined indication.

3. The control circuit of claim 1, wherein the first predetermined indication corresponds to the first control state and the second predetermined indication corresponds to the second control state.

4. The control circuit of claim 1, wherein the control circuit further comprises an apparatus adapted for receiving a software control indication from the host, and for causing one of the first and second predetermined indications to be stored in the first storage and second storage elements in response to receiving the software control indication.

5. The control circuit of claim 1, wherein the control circuit further comprises an apparatus coupled with the host and adapted for receiving a software reset indication from the host, and wherein the reset-generating apparatus is further adapted to generate the reset indication in response to the software reset indication.

6. The control circuit of claim 1, wherein the graphics controller further includes a reset input for receiving a hardware reset indication from the host, and wherein the reset-generating apparatus is further adapted to generate the reset indication in response to the hardware reset indication.

7. A control circuit for enabling a host to control a power cut-off protection circuit, the protection circuit being adapted for preventing damage to a level-shifter when tower to a peripheral is cut-off, the level-shifter for providing level-shifted signals and for coupling with the peripheral, the control circuit being suitable for use in a graphics controller that includes the level-shifter and the power cut-off protection circuit, the power cut-off protection circuit being coupled with the level-shifter and having a protection-circuit-control input for selecting one of first and second control states, the control circuit comprising:

a memory pair including:

a polarity-selecting input, a first storage element having an input, first storage output, an initial-state input coupled with the polarity-selecting input, and being adapted to respond to a particular indication on the initial-state input by outputting predetermined indication, a second storage element having an input, a second storage output, an initial-state input coupled with the polarity-selecting input, and being adapted to respond to the particular indication on the initial-state input by outputting a second predetermined indication; and a first selecting circuit having first and second selecting-circuit inputs coupled respectively with the first and second storage outputs, an output coupled with the protection-circuit-control input, and a selecting input coupled with the host for selecting one of the first and second selecting-circuit inputs, wherein the control circuit thereby enables the host to control the power cut-off protection circuit following an assertion of the particular indication; and wherein the control circuit further comprises a second selecting circuit having:

a first input for receiving an on-off indication for indicating whether power to the peripheral is on or off;

a second input coupled with the output of the first selecting circuit;

a selecting input for selecting one of the first and second inputs; and an output coupled with the protection-circuit-control input.

8. The control circuit of claim 7, wherein the control circuit further comprises a polarity-selecting apparatus for selectively inverting the on-off indication in accordance with the value of a polarity indication stored in a third storage element.

9. The control circuit of claim 7, wherein the control circuit further comprises a third storage element for receiving a mode-enable indication from the host, the third storage element having an output coupled with the selecting input of the second selecting circuit, and wherein the control circuit thereby enables the host to select between a hardware and a software mode for controlling the power cut-off protection circuit.

10. The control circuit of claim 9, the third storage element further comprising an initial-state input coupled with the polarity-selecting input, and being adapted to respond to the particular indication on the initial-state input by outputting a third predetermined indication for causing the second selecting circuit to select the second input of the second selecting circuit, wherein the control circuit thereby enables a hardware mode for controlling the power cut-off protection circuit following an assertion of the particular indication.

11. The control circuit of claim 10, wherein the control circuit further comprises an apparatus adapted for receiving a software control indication from the host, and for causing one of the first and second predetermined indications to be stored in the first storage and second storage elements in response to receiving the software control indication.

12. The control circuit of claim 10, wherein the control circuit further comprises a reset-generating apparatus for generating a reset indication, and the particular indication is the reset indication.

13. The control circuit of claim 12, wherein the graphics controller further includes a reset input for receiving a hardware reset indication from the host, and the reset-generating apparatus is adapted to generate the reset indication in response to the hardware reset indication.

14. The control circuit of claim 12, wherein the control circuit further comprises an apparatus coupled with the host and adapted for receiving a software reset indication from the host, and wherein the reset-generating apparatus is adapted to generate the reset indication in response to the software reset indication.

15. A system, comprising:

a host;

a peripheral; and a graphics controller coupled with the host comprising:

a level-shifter for providing level-shifted signals and for coupling with the peripheral;

a power cut-off protection circuit for preventing damage to the level-shifter when power to the peripheral is cut-off, the protection circuit being coupled with the level shifter and having a protection-circuit-control input for selecting one of first and second control states; and a control circuit for enabling the host to control the power cut-off protection circuit, comprising: a polarity-selecting input, a first storage element having an input, a first storage output, an initial-state input coupled with the polarity-selecting input, and being adapted to respond to a particular indication on the initial-state input by outputting a first predetermined indication, a second storage element having an input, a second storage output, an initial-state input coupled with the polarity-selecting input, and being adapted to respond to the particular indication on the initial-state input by outputting a second predetermined indication; and a first selecting circuit having first and second selecting-circuit inputs coupled respectively with the first and second storage outputs, an output coupled with the protection-circuit-control input, and a selecting input coupled with the host for selecting one of the first and second selecting-circuit inputs, wherein the control circuit thereby enables the host to control the power cut-off protection circuit following an assertion of the particular indication; and wherein the particular indication, is a reset indication, the control circuit further comprises a reset-generating apparatus for generating the reset indication, and wherein the reset-generating apparatus is further adapted to generate the reset indication in response to a reset indication internally generated by the graphics controller.

16. The system of claim 15, wherein the first predetermined indication corresponds to the first control state and the second predetermined indication corresponds to the second control state.

17. The system of claim 15, wherein the control circuit further comprises an apparatus adapted for receiving a software control indication from the host, and for causing one of the first and second predetermined indications to be stored in the first storage and second storage elements in response to receiving the software control indication.

18. The system of claim 15, wherein the control circuit further comprises an apparatus coupled with the host and adapted for receiving a software reset indication from the host, and wherein the reset-generating apparatus is further adapted to generate the reset indication in response to the software reset indication.

19. The system of claim 15, wherein the graphics controller further includes a reset input for receiving a hardware reset indication from the host, and wherein the reset-generating apparatus is further adapted to generate the reset indication in response to the hardware reset indication.

20. The system of claim 15, wherein the control circuit further comprises a second selecting circuit having:

a first input for receiving an on-off indication for indicating whether power to the peripheral is on or off;

a second input coupled with the output of the first selecting circuit;

a selecting input for selecting one of the first and second inputs; and an output coupled with the protection-circuit-control input.

21. The system of claim 20, wherein the control circuit further comprises a polarity-selecting apparatus for selectively inverting the on-off indication in accordance with the value of a polarity indication stored in a third storage element.

22. The system of claim 20, wherein the control circuit further comprises a third storage element for receiving a mode-enable indication from the host, the third storage element having an output coupled with the selecting input of the second selecting circuit, and wherein the control circuit thereby enables the host to select between a hardware and a software mode for controlling the power cut-off protection circuit.

23. The system of claim 22, the third storage element further comprising an initial-state input coupled with the polarity-selecting input, and being adapted to respond to the particular indication on the initial-state input by outputting a third predetermined indication for causing the second selecting circuit to select the second input of the second selecting circuit, wherein the control circuit thereby enables a hardware mode for controlling the power cut-off protection circuit following an assertion of the particular indication.

24. The system of claim 23, wherein the control circuit further comprises an apparatus adapted for receiving a software control indication from the host, and for causing one of the first and second predetermined indications to be stored in the first storage and second storage elements in response to receiving the software control indication.

25. The system of claim 23, wherein the control circuit further comprises a reset-generating apparatus for generating a reset indication, and the particular indication is the reset indication.

26. The system of claim 25, wherein the graphics controller further includes a reset input for receiving a hardware reset indication from the host, and the reset-generating apparatus is adapted to generate the reset indication in response to the hardware reset indication.

27. The system of claim 25, wherein the control circuit further comprises an apparatus coupled with the host and adapted for receiving a software reset indication from the host, and wherein the reset-generating apparatus is adapted to generate the reset indication in response to the software reset indication.

28. A method for enabling a host to control a power cut-off protection circuit, comprising the steps of:

storing a first indication corresponding to a first control state in first and second storage elements, each storage element having an output;

providing a storage-element-selection indication;

selecting the output of one of the first and second storage elements according to the storage-element-selection indication;

providing an indication on the selected output to a protection-circuit-control input of the power cut-off protection circuit;

receiving a mode indication, the mode indication corresponding to a particular mode for controlling the power cut-off protection circuit;

discontinuing, in response to receiving the mode indication, the step of providing the indication on the selected output to the protection-circuit-control input;

receiving an on-off indication for indicating whether power to a peripheral is on or off; and providing the on-off indication to the protection-circuit-control input.

29. The method of claim 28, further comprising the steps of:

receiving a reset indication;

storing the first indication in the first storage element in response to receiving the reset indication; and storing a second indication corresponding to a second control state in a second storage element in response to receiving the reset indication.

30. The method of claim 28, further comprising the steps of:
- receiving a reset indication;
- storing, in response to receiving the reset indication, the first indication in the first storage element;
- storing, in response to receiving the reset indication, a second indication corresponding to a second control state in a second storage element; and
- in response to receiving the reset indication, re-continuing the step of providing the indication on the selected output to the protection-circuit-control input, and discontinuing the step of providing the on-off indication to the protection-circuit-control input.

* * * * *

UNITED STATES PATENT AND TRADEMARK OFFICE
CERTIFICATE OF CORRECTION

PATENT NO.       : 7,191,352 B2
APPLICATION NO.  : 10/902542
DATED            : March 13, 2007
INVENTOR(S)      : Atousa Soroushi et al.

It is certified that error appears in the above-identified patent and that said Letters Patent is hereby corrected as shown below:

<u>Column 9</u>

Line 37, please change "when tower" to --when power--.

Signed and Sealed this

Twenty-fifth Day of December, 2007

JON W. DUDAS
*Director of the United States Patent and Trademark Office*